Sept. 27, 1960
L. C. HARDISON
2,954,512
ELECTRIC SWITCH CIRCUIT
Filed Sept. 2, 1955
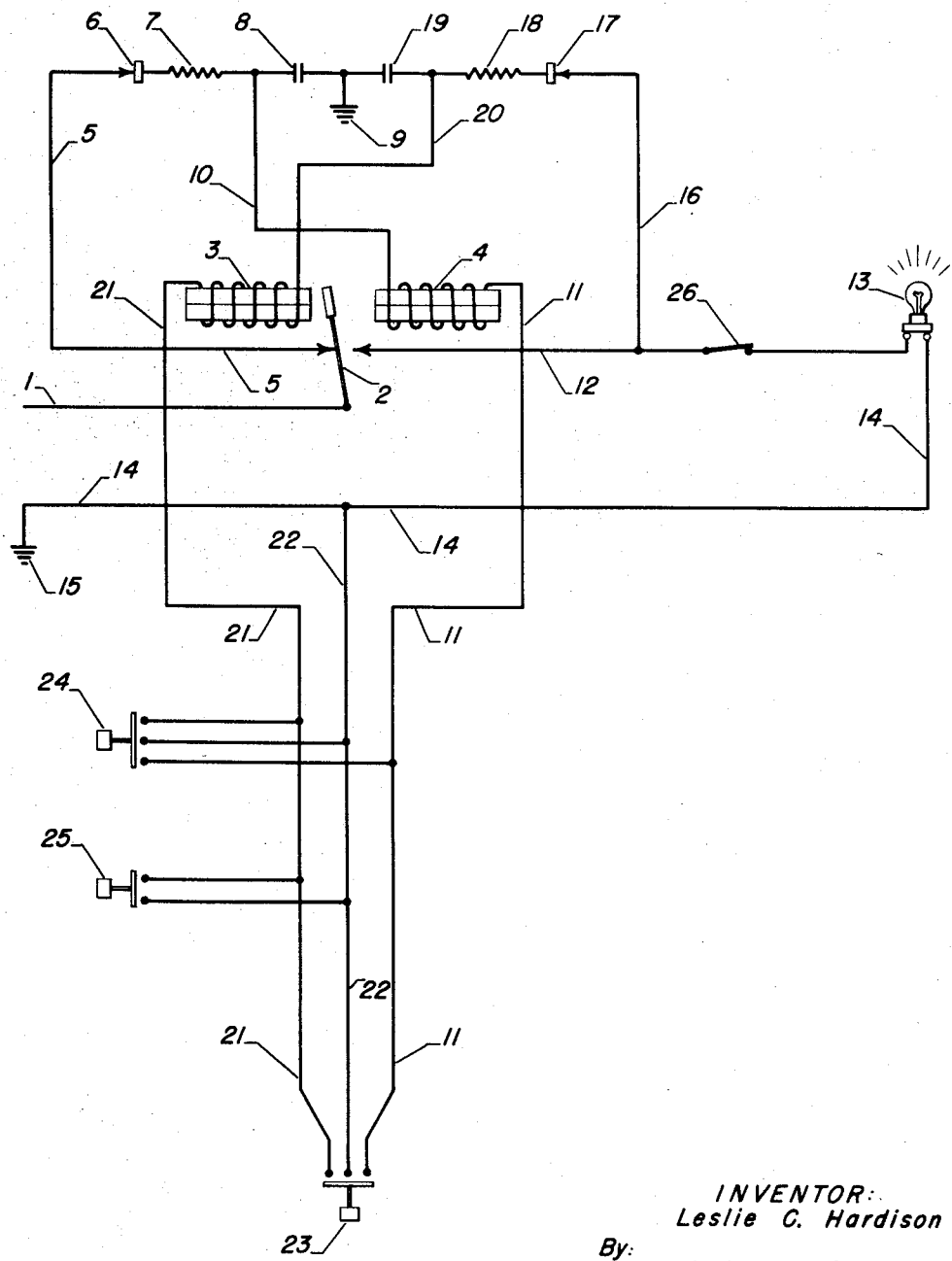
INVENTOR:
Leslie C. Hardison
By:
Chester J. Giuliani
ATTORNEY:
Glen R. Grunewald
AGENT:

United States Patent Office 2,954,512
Patented Sept. 27, 1960

2,954,512

ELECTRIC SWITCH CIRCUIT

Leslie C. Hardison, Des Plaines, Ill., assignor, by mesne assignments, to Universal Oil Products Company, Des Plaines, Ill., a corporation of Delaware Filed Sept. 2, 1955, Ser. No. 532,296

8 Claims. (Cl. 317—151)

This invention relates to a switch circuit for starting electrically powered equipment and in particular to a switch circuit adapted to operating many pieces of equipment from one station or one piece of equipment from many stations.

In many applications it is desirable to operate many pieces of equipment from a single control station. As typical examples of this, it may be desirable to turn off or turn on all of the lamps in a large building such as a warehouse or factory from a single control station thereby eliminating long tours through semidarkness with the inherent danger and inconvenience. It may also be desirable to insure that all heaters, soldering irons, electric motors, electric furnaces, etc., in a factory or the like are turned off before leaving for the night in which case the circuit of this invention would provide a means of deadening all electric outlets from a single control station.

Similarly it is frequently desirable to turn on one or a number of pieces of electric equipment from many control stations. For example again all of the lamps in a large building may be turned on from any doorway or entrance so that it is not essential to enter in a particular place in order to have light. Similarly, it is very desirable to turn on an alarm system or to actuate an emergency piece of equipment such as a sprinkler system or a tear gas discharge from many points.

It is an object of this invention to provide a switch circuit to operate either many pieces of equipment from a single control station or one piece of equipment from many control stations or even many pieces of equipment from many control stations. It is a further object of this invention to provide a switch circuit wherein the switch may function using light, cheap signal wire which does not carry the electric power required to drive load but merely a small control amount of power required to operate the switch. It is a further object to provide a switch circuit which is energized only when switching on or off and not during a running period or an off period of the equipment. This is an advantage in that the switch is conservative of power and imparts long life to the components of the circuit in as much as they are out of use substantially all of the time.

Other advantages of the switch of this invention are that it may employ a relatively infallible and silent pushbutton instead of a toggle switch or knife switch, it is composed of cheap and readily available components, it is safe to install and to use since the switch circuit carries very low power and cannot carry energy except for a very brief period without automatically shutting itself off. Another advantage to this switching circuit is that it can be used either in addition to conventional switches or in place thereof.

In one embodiment, this invention provides an electric switch circuit comprising in combination a double throw relay actuated by a circuit-closing coil which places said relay in a closed circuit position and a circuit-opening coil which places said relay in an open circuit position, said relay in the open circuit position connected serially to a first rectifying means, a first electric resistance and a first capacitor having sufficient capacitance to operate said relay upon discharging, said capacitor connected to said circuit closing coil and said circuit closing coil connected to one pole of a three pole switching means, said relay in the closed circuit position connected to two parallel paths, the first connected serially through the load and to the ground and the second connected serially to a second rectifying means, a second electric resistance and a second capacitor having sufficient capacitance to operate said relay upon discharging, said second capacitor connected to said circuit opening coil and said circuit opening coil connected to a second pole of said three pole switch with the third pole of said three pole switch connected to the ground.

The objects and advantages of this invention can best be described with reference to the accompanying drawing which illustrates one embodiment of this invention and is intended to be illustrative rather than limiting upon its broad scope.

Referring to the drawing, voltage imposed between lines 1 and 14 operates load 13 herein illustrated as an electric lamp. Line 14 may be returned to the source of electric power or grounded at point 15 as herein illustrated to complete the circuit. The energy in line 1 passes to the armature of relay 2 which may be either to the left or the right when actuated by either coil 3 or 4 respectively. When drawn to the left as herein shown armature 2 energizes line 5 which passes through rectifier 6 to convert the energy to direct current and resistance 7 to reduce the flow of energy to a very small quantity. The direct current energy thus flowing through resistor 7 charges capacitor 8 which in this embodiment is shown grounded at point 9. Line 10 connected to capacitor 8 connects to coil 4 which is the circuit closing coil and through line 11 to pushbutton station 23.

It may be seen that when dealing with direct current, the use of rectifier 6 may be dispensed with since its use is appropriate only in alternating current circuits. It may also be seen here that when the circuit is open as shown; after capacitor 8 is charged no further current flows through the circuit of line 5 and its associated parts since this circuit is open at the beforementioned pushbutton 23.

When it is desired to put lamp 13 in operation, pushbutton 23 is depressed which completes the circuit from capacitor 8 through line 10, coil 4, line 11 and to the ground through the pushbutton and line 22 thereby energizing coil 4 momentarily and causing armature 2 of the double throw relay to contact the opposite pole of the relay and energize line 12.

With line 12 energized, electric energy flows through two parallel paths. The first of these carries energy through switch 26 and load 13 and to the ground through line 14 thereby energizing the load that the present switch circuit controls. A second path that the energy in line 12 flows through is line 16, rectifier 17 when A.C. current is employed and a rectifier is appropriate, resistance 18 to diminish the current to that required and capacitor 19 wherein a charge is stored. As in the corresponding circuit for operating the other coil, capacitor 19 is grounded and connected by means of line 20 to circuit opening coil 3 which in turn is connected via line 21 to the third pole of pushbutton 23.

It may be seen that when pushbutton 23 is again depressed it closes the circuit between capacitor 19 and the ground at point 15 thereby energizing coil 3 and opening the circuit so that the load at point 13 is no longer energized. It may be seen that lines 11 and 21 carrying current from capacitors 8 and 19 respectively to the pushbutton station 23 do not carry current except for a brief interval after the pushbutton is depressed. Furthermore, the current that it does carry is of very small magnitude compared to that required to operate the load. Therefore, extremely light, fine and inexpensive wire may be used between the capacitors and the pushbutton. With the elimination of the need of heavy and expensive wiring between the load and the switch, it is economically feasible to string the signal wire composed of lines 11, 21 and 22, which may be a small three-strand wire, entirely around a large area setting up various pushbutton stations where appropriate. These may be set up as in the drawing in the case of pushbutton 24 which connects all three of these wires when depressed and serves the same function as pushbutton 23. Both of these are preferably spring loaded so that contact is made only when they are depressed. Another variation may be to employ a pushbutton such as pushbutton 25 which connects to line 21 and line 22 so that depressing pushbutton 25 will have the effect of turning off the load but will not, if redepressed, turn it on. It may readily be seen that other pushbuttons may be disposed across various members of lines 21, 22 and 11 to either turn off all loads, turn on all loads as for example, a two-pole pushbutton connected between lines 11 and 22, or to turn off and turn on all loads with alternate pushes of the button as described.

As hereinbefore described, this circuit may be used in addition to an ordinary switch which may be disposed for example, as switch 26 is disposed. Therefore, as in the example of a lamp, an ordinary toggle switch on the wall in the immediate vicinity of the overhead lamp may be employed for turning on and turning off the lamp, however, the lamp may be turned off from a remote position by means of the apparatus of this invention.

I claim as my invention:

1. An electric switch circuit comprising in combination double-throw relay contacts actuated by a first coil which places said contacts in a first position and a second coil which places said contacts in a second position, a source of potential connected between ground and the common pole of said contacts, said contacts in the first position connecting the ungrounded side of said potential source to a first electric resistance serially connected to one end of said second coil, a first capacitor connecting the junction point of said first resistance and said second coil to ground, said contacts in the second position connecting the ungrounded side of said potential source to a second electric resistance serially connected to one end of said first coil, a second capacitor connecting the junction point of said second resistance and said first coil to ground, and normally-open switching means connecting the other ends of said first and second coils to ground.

2. An electric switch circuit comprising in combination double-throw relay contacts actuated by a first coil which places said contacts in a first position and a second coil which places said contacts in a second position, a source of potential connected between ground and the common pole of said contacts, said contacts in the first position connecting the ungrounded side of said potential source to one end of said second coil through a first series circuit comprising a diode rectifier connected in series with an electric resistance, a first capacitor connecting the junction point of said first series circuit and said second coil to ground, said contacts in the second position connecting the ungrounded side of said potential source to one end of said first coil through a second series circuit comprising a diode rectifier connected in series with an electric resistance, a second capacitor connecting the junction point of said second series circuit and said first coil to ground, and normally-open switching means connecting the other ends of said first and second coils to ground.

3. The apparatus of claim 2 further characterized in that said switching means comprises two normally-open two pole switches, one switch connecting said first coil to ground and the other switch connecting said second coil to ground.

4. The apparatus of claim 2 further characterized in that said switching means comprises a normally-open three pole switch with two poles connected respectively to said first and second coils and the third pole connected to ground, whereby said first and second coils are simultaneously grounded upon closure of said switch, and the impedances of said first and second series circuits are at least sufficiently high in relation to the impedances of said second and first coils respectively as to limit the current flowing through either coil upon prolonged closure of said switch to a value below that required to operate said relay contacts.

5. The apparatus of claim 4 further characterized in that a normally-open two pole switch is connected between one of said coils and ground.

6. The apparatus of claim 5 further characterized in that a second normally-open two pole switch is connected between the other of said coils and ground.

7. An electric switch circuit comprising in combination double-throw relay contacts actuated by a circuit-closing coil which places said contacts in a closed circuit position and a circuit-opening coil which places said contacts in an open circuit position, a source of potential connected between ground and the common pole of said contacts, said contacts in the open circuit position connecting the ungrounded side of said potential source to one end of said circuit-closing coil through a first series circuit comprising a diode rectifier connected in series with an electric resistance and said contacts in the closed circuit position simultaneously connecting the ungrounded side of said potential source (1) to a grounded load and (2) to one end of said circuit-opening coil through a second series circuit comprising a diode rectifier connected in series with an electric resistance, a normally-open three-pole switch having two poles connected respectively to the other ends of said circuit-opening and circuit-closing coils and the third pole connected to ground whereby said coils are simultaneously grounded upon the closure of said switch, a first capacitor connecting the junction point of said first series circuit and said circuit-closing coil to ground and a second capacitor connecting the junction point of said second series circuit and said circuit-opening coil to ground, said first capacitor having sufficient capacitance to operate said contacts upon discharging through said circuit-closing coil and said second capacitor having sufficient capacitance to operate said contacts upon discharging through said circuit-opening coil, and the impedances of said first and second series circuits being at least sufficiently high in relation to the impedances of said circuit-closing and circuit-opening coils respectively as to limit the current flowing through either coil upon prolonged closure of said switch to a value below that required to operate said relay contacts.

8. The apparatus of claim 7 further characterized in that at least one additional three pole switch is in parallel with said three pole switch.

References Cited in the file of this patent

UNITED STATES PATENTS

| 2,066,614 | Dohle | Jan. 5, 1937 |
| 2,456,256 | Crowley | Dec. 14, 1948 |
| 2,504,996 | MacDonald | Apr. 25, 1950 |
| 2,635,197 | Routledge | Apr. 14, 1953 |
| 2,710,365 | MacDougall | June 7, 1955 |
| 2,764,715 | Lorenz | Sept. 25, 1956 |
| 2,801,372 | Renick | July 30, 1957 |